(12) United States Patent
Fan et al.

(10) Patent No.: US 7,576,978 B2
(45) Date of Patent: Aug. 18, 2009

(54) COMPUTER ENCLOSURE WITH DISK DRIVE BRACKET

(75) Inventors: Chen-Lu Fan, Taipei Hsien (TW); Yu-Feng Hung, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 51 days.

(21) Appl. No.: 11/838,244

(22) Filed: Aug. 14, 2007

(65) Prior Publication Data

US 2008/0298008 A1 Dec. 4, 2008

(30) Foreign Application Priority Data

Jun. 4, 2007 (CN) .................... 2007 2 0200444 U

(51) Int. Cl.
*H05K 5/00* (2006.01)
*H05K 7/00* (2006.01)
*H05K 7/16* (2006.01)
(52) U.S. Cl. ........................... 361/679.37; 361/679.33; 361/679.39; 361/727

(58) Field of Classification Search ................. 361/685, 361/727, 679.31, 679.33, 679.37, 679.39
See application file for complete search history.

(56) References Cited

U.S. PATENT DOCUMENTS

| | | | |
|---|---|---|---|
| 6,102,500 A * | 8/2000 | Chen | 312/223.2 |
| 6,256,195 B1 * | 7/2001 | Liao | 361/685 |
| 6,377,449 B1 * | 4/2002 | Liao et al. | 312/223.2 |
| 6,452,792 B1 * | 9/2002 | Chen | 361/685 |
| 2003/0206397 A1 * | 11/2003 | Allgeyer et al. | 361/685 |
| 2004/0173544 A1 * | 9/2004 | Chen | 211/26 |

* cited by examiner

*Primary Examiner*—Jayprakash N Gandhi
*Assistant Examiner*—Anthony M Haughton
(74) *Attorney, Agent, or Firm*—Frank R. Niranjan

(57) ABSTRACT

A computer enclosure comprising a chassis (3) and a disk drive bracket (1). The chassis comprising a bottom panel (32), at least one protrusion (321) disposed on the bottom panel, the protrusion comprising a neck portion (323) and an expanded head portion (325), which having a top surface (327). The disk drive bracket comprising a bottom wall which has an interior surface (122), at least one recess (1 8) defined in the bottom wall, each recess having a fixing slot (121), each fixing slot comprising a narrow fixing aperture (125) and a wide entrance aperture (123). The head portion of the protrusion being embedded in the recess, the top surface (327) of the head portion being not higher than the interior surface of the bottom panel.

7 Claims, 4 Drawing Sheets

COMPUTER ENCLOSURE WITH DISK DRIVE BRACKET

BACKGROUND

1. Field of the Invention

The present invention relates to computer enclosures, and more particularly to a computer enclosure with a disk drive bracket.

2. General Background

When a conventional computer is assembled, at least one disk drive bracket is mounted in a computer enclosure. Data storage devices such as a hard disk drive, a floppy disk drive, and a compact disk read only memory drive are then attached to the drive bracket.

A disk drive bracket is usually secured to a computer enclosure between one side panel and a front panel of the computer enclosure. U.S. Pat. No. 6,811,230 discloses an electronic apparatus including an enclosure having a plurality of wall portions. A bracket has a loading slot and is removably mounted in the enclosure. A module has a protuberance and a tapped hole and is capable of being loaded into and unloaded from the bracket through the loading slot. The bracket has an engaging portion configured to engage with the protuberance to hold the module in a predetermined position in the bracket. An aperture is located in a position opposite the tapped hole of the module, which is held in the predetermined position. Thus a screw is driven into the tapped hole through the aperture. The engaging portion includes a raised portion formed by inwardly raising a part of the bracket and a slit formed in the raised portion, which is opened toward the loading slot of the bracket. The slit is capable of being penetrated by a part of the protuberance.

However, because the typical computer enclosure has a complicated structure, and includes a plurality of storage devices assembled into the drive brackets, vibrations will occur and the bottom panels of the drive brackets are prone to be distorted.

What is needed, therefore, is a computer enclosure having a simple structure for securely housing a disk drive bracket therein.

SUMMARY

A computer enclosure comprising a chassis and a disk drive bracket. The chassis comprising a bottom panel, at least one protrusion disposed on the bottom panel, the protrusion comprising a neck portion extending upwardly from the bottom panel and an expanded head portion formed at a top portion of the neck, the head portion having a top surface. The disk drive bracket comprising a bottom wall which has an interior surface, at least one recess corresponding to the protrusion of the chassis being defined in the bottom wall of the disk drive bracket, each recess having a fixing slot, each fixing slot comprising a narrow fixing aperture engaging with the neck portion of the protrusion and a wide entrance aperture configured to allow the head portion of the protrusion extending therethrough, the entrance aperture being in communication with the fixing aperture, the head portion of the protrusion being embedded in the recess of the bottom wall, the top surface of the head portion being not higher than the interior surface of the bottom panel.

Other advantages and novel features of the present invention will become more apparent from the following detailed description of a preferred embodiment when taken in conjunction with the accompanying drawings, in which:

DETAILED DESCRIPTION

Figure 1:
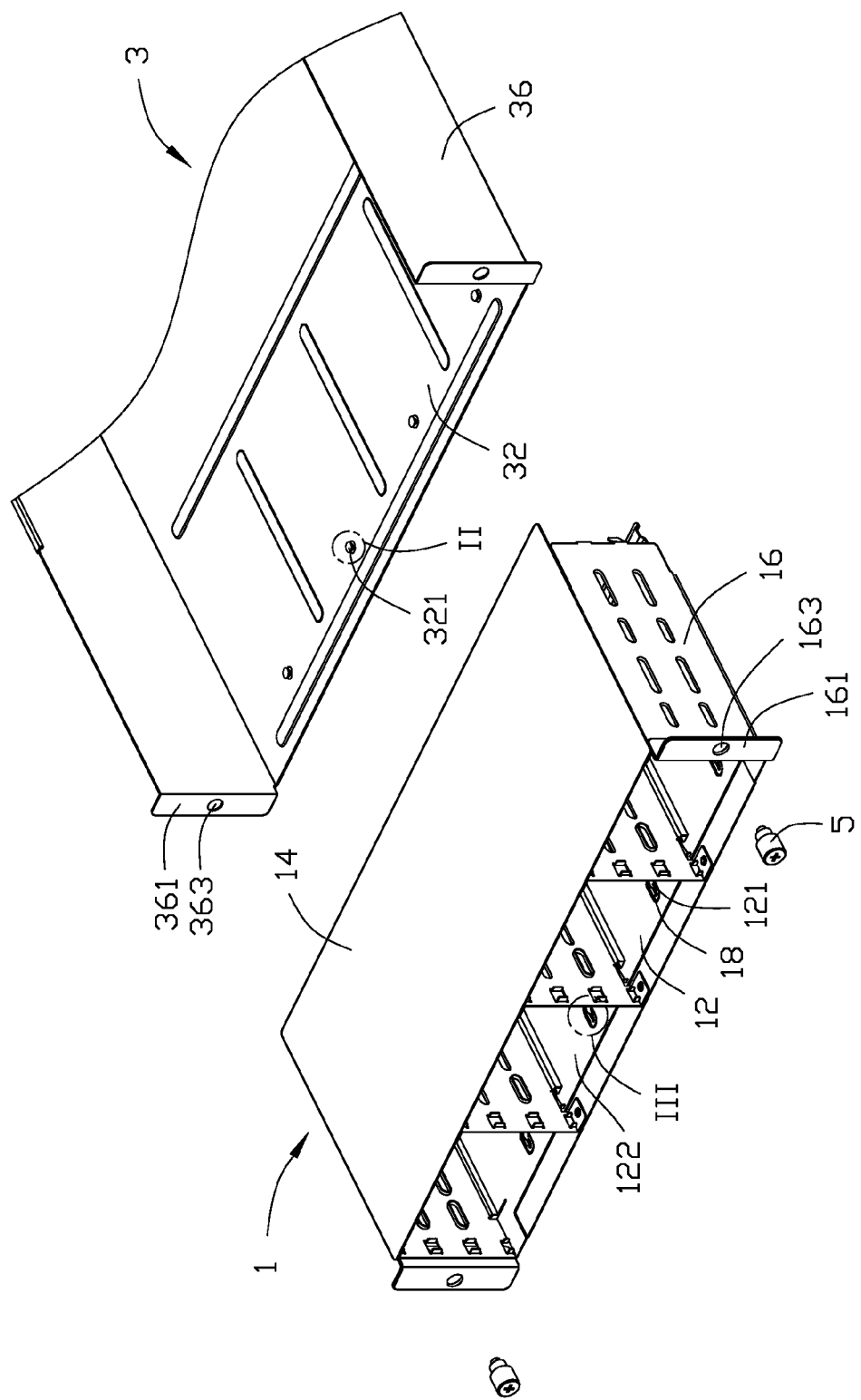
FIG. 1 is an exploded, isometric view of a computer enclosure in accordance with a preferred embodiment of the present invention, the computer enclosure including a chassis, and a disk drive bracket.

Referring to FIG. 1, a computer enclosure in accordance with an embodiment of the present invention includes a disk drive bracket 1 configured for accommodating a plurality of data storage devices (not shown) therein, a chassis 3 configured for receiving the disk drive bracket 1, and a plurality of other electronic components (not shown) therein.

Figure 2:
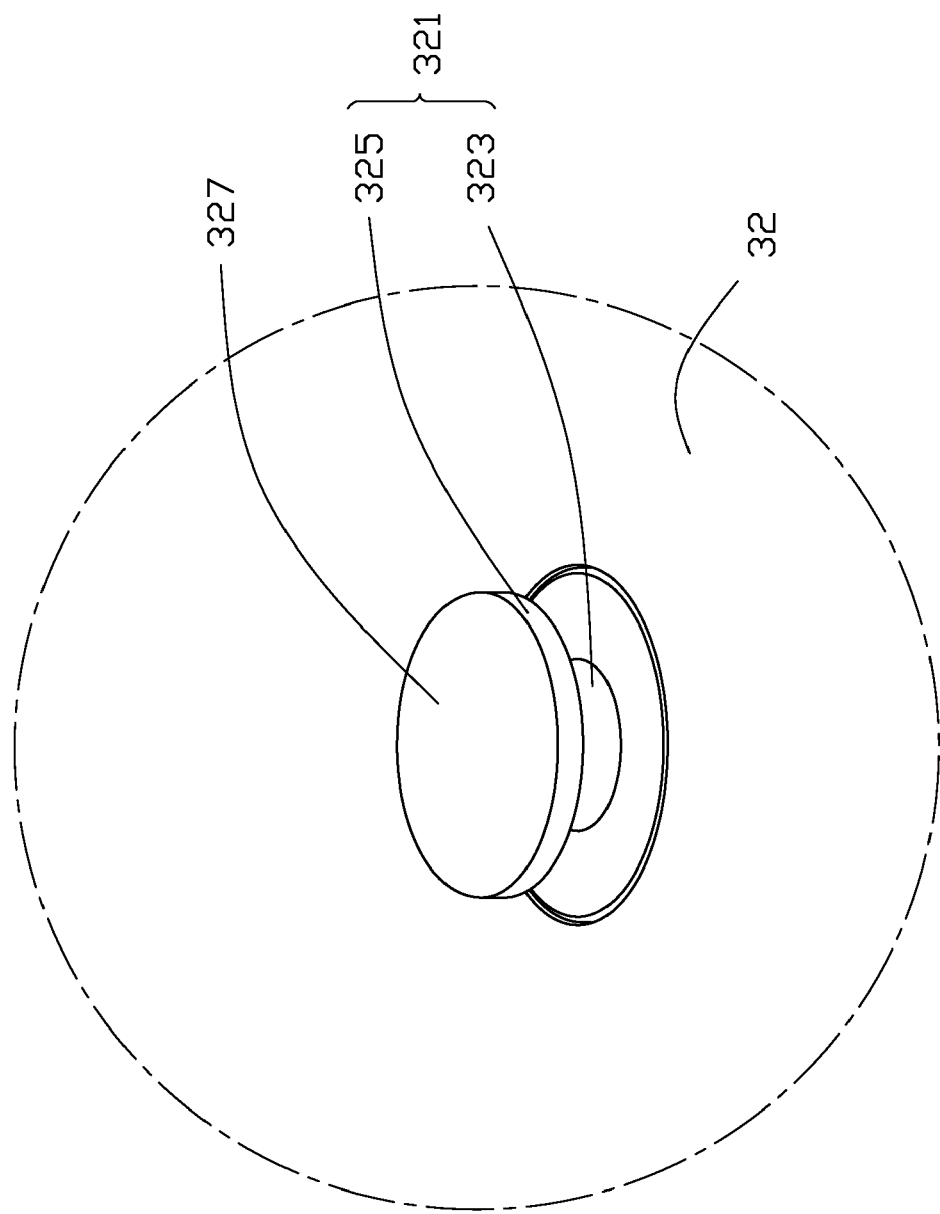
FIG. 2 is an enlarged view of encircled portion II of FIG. 1
Figure 3:
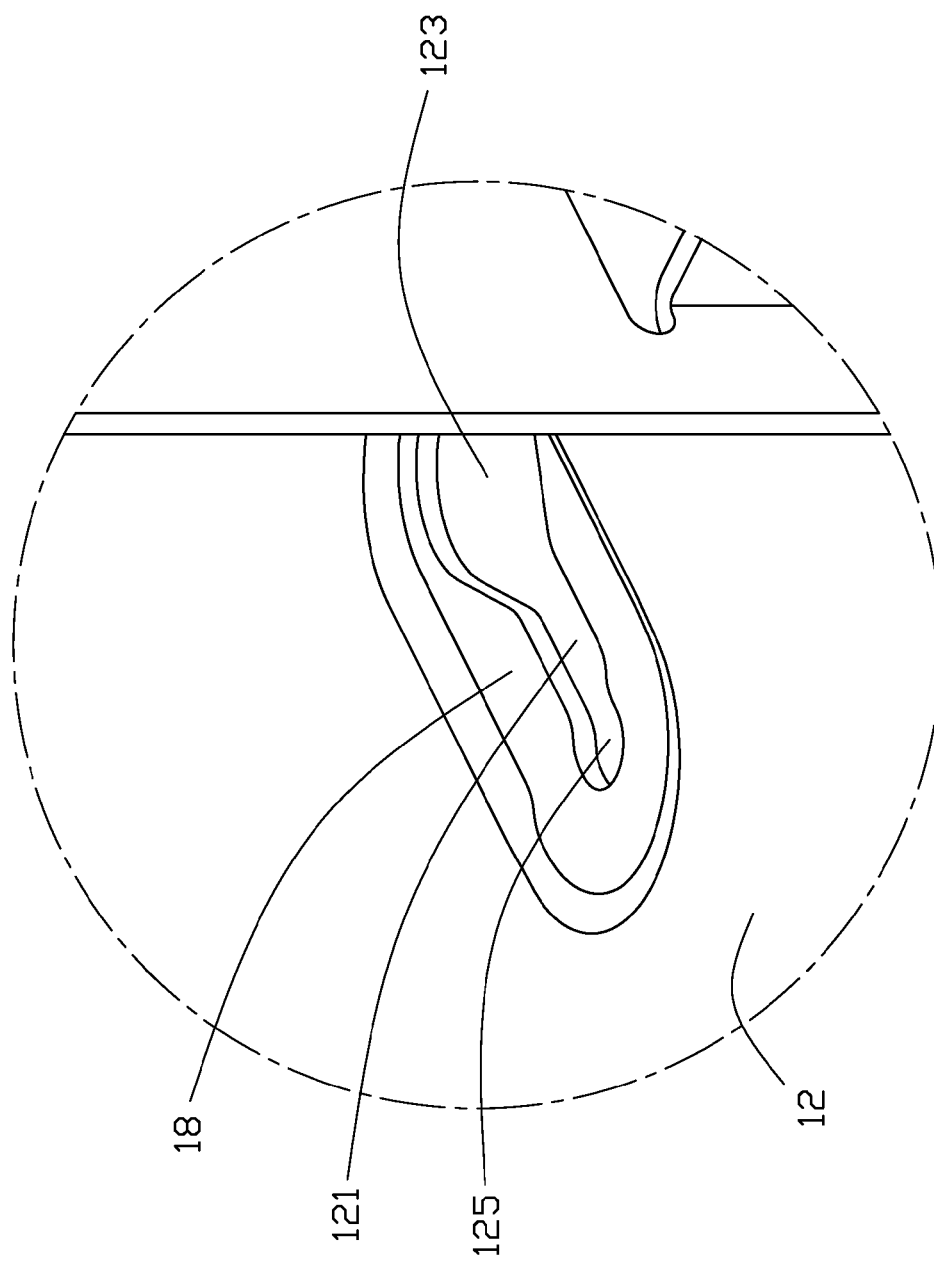
FIG. 3 is an enlarged view of encircled portion III of FIG. 1.

Referring to FIG. 1 to FIG. 3, the disk drive bracket 1 includes a bottom wall 12 which has an interior surface 122, a pair of sidewalls 16 perpendicularly formed from two opposite sides of the bottom wall 12, and a top wall 14. The bottom wall 12, the top wall 14, and the sidewalls 16 cooperatively form a receiving space. A flange 161 extends out perpendicularly from each sidewall 16 of the disk drive bracket 1. A securing hole 163 is defined in each of the flange 161. A plurality of generally ellipse shaped recesses 18 is defined in the bottom wall 12 of the disk drive bracket 1. Each recess 18 has a fixing slot 121 defined in a bottom thereof. Each fixing slot 121 has a wide portion serving as an entrance aperture 123 and a narrow portion serving as a fixing aperture 125. The entrance aperture 123 is in communication with the fixing aperture 125. The depth of the recess 18 increases gradually from one end to the other end, the fixing aperture 125 is disposed at the deep end, and the entrance aperture 123 is disposed at the shallow end. The fixing slots 121 are located adjacent to an opening of the chassis 3 from which the bracket 1 is slid into the chassis 3.

Referring to FIG. 1 and FIG. 2, the chassis 3 includes a bottom panel 32 and a pair of opposite side panels 36 perpendicularly formed from the bottom panel 32. A plurality of protrusion 321 extends up from the bottom panel 32 of the chassis 3. Each of the protrusion 321 includes a neck portion 323 and an expanded head portion 325. The head portion 323 has a top surface 327. A flange 361 corresponding to each flange 161 of the disk drive bracket 1 extends out perpendicularly from each of the side panels 36 of the chassis 3. A securing hole 363 is defined in each flange 361 respectively corresponding to each securing hole 163 of the disk drive bracket 1. A diameter of each of the entrance apertures 123 of the fixing slots 121 is greater than that of the head portion 325 in cross section. A diameter of each of the fixing apertures 125 of the fixing slots 121 of the disk drive bracket 1 is less than that of the head portion 325 in cross section, but approximately equal to that of the neck portion 323.

Figure 4:
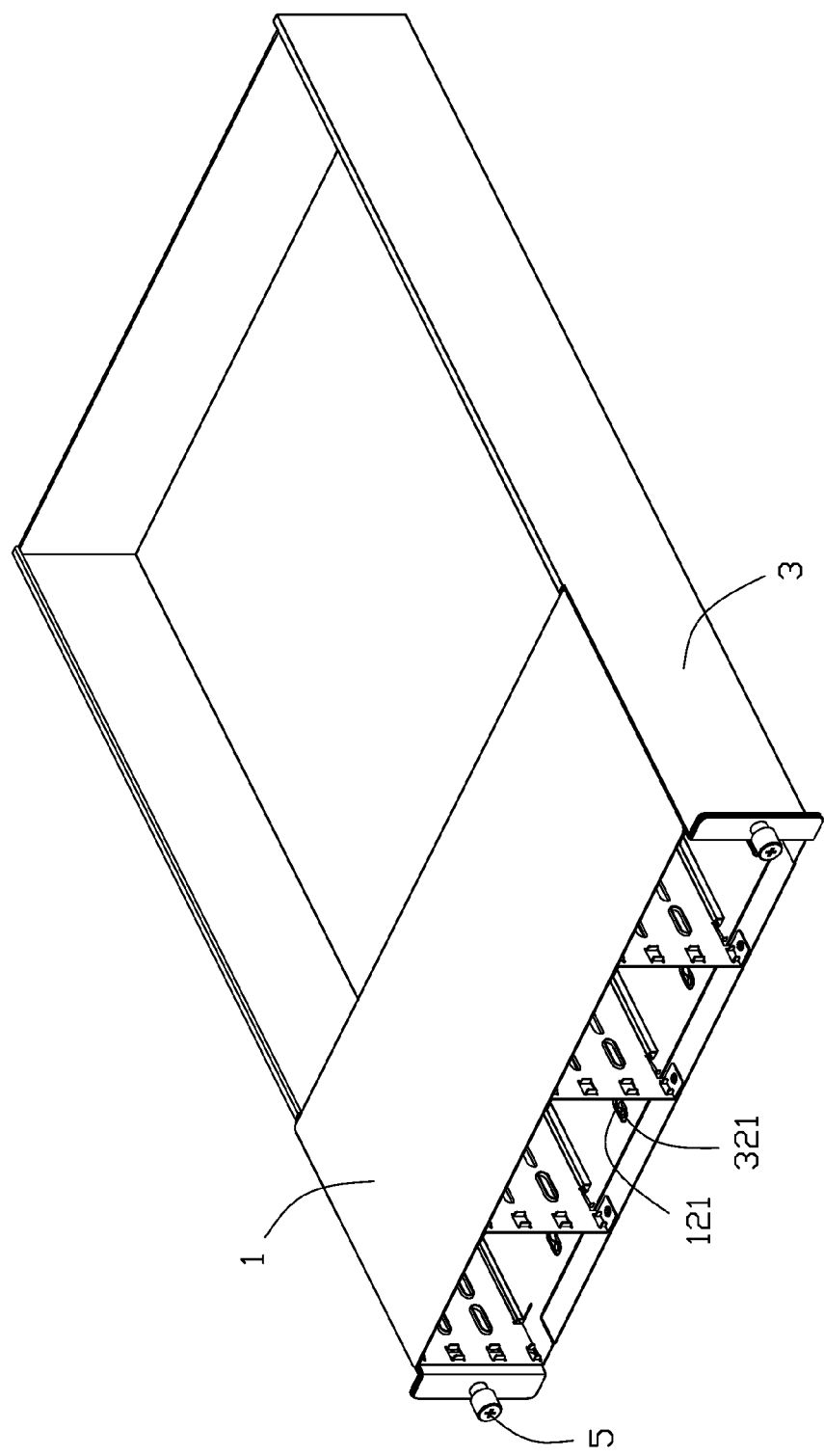
FIG. 4 is an assembled view of FIG. 1.

Referring to FIG. 4, in assembly of the disk drive bracket 1, the protrusion 321 of the chassis 3 are inserted into the corresponding entrance apertures 123 of the disk drive bracket 1. Then the disk drive bracket 1 is pushed into the chassis 3. Each neck portion 323 of the protrusion 321 reach an end of the corresponding fixing aperture 125 of the disk drive bracket 1. The flanges 161 of the disk drive bracket 1 abut against the flanges 361 of the chassis 3 respectively. At this point, the securing holes 163 of the flanges 161 of the disk drive bracket 1 are in alignment with the securing holes 363 of the flanges 361 of the chassis 3 respectively. Two screws 5 respectively extend through the securing holes 163 and 363, fastening the disk drive bracket 1 into the chassis 3. Thus, the data storage devices are secured into the chassis 3 via the disk drive bracket 1. The necks 323 of the chassis 3 engage in the fixing slots 121 of the disk drive bracket 1, the recesses 18 accommodate the head portions 325 of the protrusion 321. The top surfaces 327 of the head portions 325 are lower than the interior surface 122 of the bottom panel 12.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
    a chassis comprising a bottom panel, at least one protrusion disposed on the bottom panel, the protrusion comprising a neck portion extending upwardly from the bottom panel and an expanded head portion formed at a top portion of the neck, the head portion having a top surface; and
    a disk drive bracket comprising a bottom wall which has an interior surface, at least one recess corresponding to the protrusion of the chassis being defined in the bottom wall of the disk drive bracket, the at least one recess having a fixing slot, each fixing slot comprising a narrow fixing aperture engaging with the neck portion of the protrusion and a wide entrance aperture configured to allow the head portion of the protrusion extending therethrough, the entrance aperture being in communication with the fixing aperture, the head portion of the protrusion being embedded in the at least one recess of the bottom wall, the top surface of the head portion being not higher than the interior surface of the bottom panel; wherein the depth of the at least one recess increases gradually from one end to the other end, the fixing aperture is disposed at the deep end, and the entrance aperture is disposed at the shallow end.

2. The computer enclosure as described in claim 1, wherein a diameter of a cross section of the head of the protrusion of the chassis is smaller than that of the entrance aperture of the fixing slot of the disk drive bracket.

3. The computer enclosure as described in claim 2, wherein a diameter of the fixing aperture of the fixing slot of the disk drive bracket is smaller than that of the cross section of the head of the protrusion of the chassis.

4. The computer enclosure as described in claim 3, wherein a diameter of the fixing aperture of the fixing slot of the disk drive bracket is approximately equal to that of a cross section of the neck of the protrusion.

5. An electronic apparatus enclosure comprising:
    a chassis comprising a bottom panel, and a pair of side panels extending from two opposite sides of the bottom panel respectively, a plurality of protrusion being disposed on the bottom panel, the protrusion comprising a narrow neck extending upwardly from the bottom panel and a wide head extending from the neck; and
    a disk drive bracket secured to the chassis and configured for holding data storage devices therein, the bracket comprising a bottom wall supported on an interior surface of the bottom panel of the chassis and a pair of opposite sidewalls resisting against the side panels of the chassis respectively, at least one recess corresponding to the protrusion of the chassis being defined in the bottom wall of the disk drive bracket, the at least one recess having a fixing slot, each of the fixing slots comprising a wide entrance aperture configured to allow the head of the corresponding protrusion extending therethrough, and a narrow fixing aperture configured to engage with the corresponding protrusion at the neck thereof; wherein the depth of the at least one recess increases gradually from one end to the other end, the fixing aperture is disposed at the deep end, and the entrance aperture is disposed at the shallow end.

6. The electronic apparatus enclosure as described in claim 5, wherein a first flange extends perpendicularly from each of the sidewalls of the bracket, a second flange extends from each of the side panels of the chassis, coaxial securing holes are respectively defined in the first and second flanges, screws are inserted through the coaxial securing holes to secure the bracket to the chassis.

7. The electronic apparatus enclosure as described in claim 5, wherein the fixing slots are located adjacent to an opening of the chassis from which the bracket is slid into the chassis.

* * * * *